United States Patent
Kim

(10) Patent No.: US 6,219,023 B1
(45) Date of Patent: Apr. 17, 2001

(54) VIDEO SIGNAL CONVERTING APPARATUS WITH DISPLAY MODE CONVERSION AND A DISPLAY DEVICE HAVING THE SAME

(75) Inventor: Byoung-Han Kim, Kyungki-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/889,131

(22) Filed: Jul. 7, 1997

(30) Foreign Application Priority Data

Jul. 5, 1996 (KR) .................................................. 96-27288
Dec. 10, 1996 (KR) .................................................. 96-64027

(51) Int. Cl.[7] ....................................................... G09G 5/00
(52) U.S. Cl. ............................ 345/127; 345/130; 345/132
(58) Field of Search ................................... 345/127, 130, 345/132, 150, 302

(56) References Cited

U.S. PATENT DOCUMENTS

| | | | |
|---|---|---|---|
| 4,654,484 | * 3/1987 | Reiffel et al. | 348/17 |
| 4,851,826 | * 7/1989 | Davis | 345/127 |
| 5,051,929 | * 9/1991 | Tutt et al. | 345/149 |
| 5,245,328 | * 9/1993 | Garrett | 345/127 |
| 5,301,265 | * 4/1994 | Itoh . | |
| 5,406,308 | * 4/1995 | Shiki | 345/431 |
| 5,471,563 | * 11/1995 | Dennis et al. . | |
| 5,528,740 | * 6/1996 | Hill et al. . | |
| 5,535,018 | * 7/1996 | Yamano et al. . | |
| 5,557,691 | * 9/1996 | Izuta . | |
| 5,568,597 | * 10/1996 | Nakayama et al. . | |
| 5,612,715 | * 3/1997 | Karaki et al. . | |
| 5,642,138 | * 6/1997 | Hijikata | 345/193 |
| 5,696,531 | * 12/1997 | Suzuki et al. | 345/132 |

* cited by examiner

Primary Examiner—Richard A. Hjerpe
Assistant Examiner—Anthony J. Blackman
(74) Attorney, Agent, or Firm—Robert E. Bushnell, Esq.

(57) ABSTRACT

A video signal converting apparatus converts a low-resolution video signal from a host into a different-resolution video signal capable of being displayed on the entire screen of a high-resolution supporting display device. The apparatus has a memory for storing the digital video signals and a horizontal output generator. The horizontal output generator receives first and second data signals and a horizontal synchronization signal and generates a horizontal output signal for enabling the digital video signals corresponding to each horizontal line of the second display to be stored or read from the memory. A number of pixels per cycle of the horizontal output signal is equal to a value of the first data signal, and a number of pixels per pulse width of the horizontal output signal is equal to a value of the second data signal. The apparatus has a memory controller for controlling reading and storing operations of the memory in accordance with the horizontal and vertical synchronization signals, the horizontal output signal, the first data signal, a third data signal determined according to frequencies of the horizontal and vertical synchronization signals, a first pixel clock signal for a write operation of the memory and a second pixel clock signal for a read operation of the memory.

10 Claims, 14 Drawing Sheets

VIDEO SIGNAL CONVERTING APPARATUS WITH DISPLAY MODE CONVERSION AND A DISPLAY DEVICE HAVING THE SAME

CLAIM OF PRIORITY

This application makes reference to; incorporates the same herein, and claims all benefits accruing under 35 U.S.C. §119 from applications for A VIDEO SIGNAL CONVERTING APPARATUS WITH DISPLAY MODE CONVERSION AND A DISPLAY DEVICE HAVING THE SAME earlier filed in the Korean Industrial Property Office on the 5th day of July 1996 and there duly assigned Ser. No. 27288/1996, and for A VIDEO SIGNAL CONVERTING APPARATUS WITH DISPLAY MODE CONVERSION AND A DISPLAY DEVICE HAVING THE SAME earlier filed in the Korean Industrial Property Office on the 10th day of December 1996 and there duly assigned Ser. No. 64027/1996, copies of which applications are annexed hereto.

BACKGROUND OF THE INVENTION

1. Field of the Invention

The present invention relates to an apparatus for converting a low-resolution video signal supplied from a host into a video signal having a different-resolution, and a display device having such an apparatus.

2. Description of the Related Art

Each display device, such as an LCD (liquid crystal display) device, and a plasma display device has a plurality of pixels for displaying an image, whose brightness is controlled in accordance with video information provided from a host.

A typical active matrix LCD device, which is provided with an LCD control unit and an LCD panel, displays an image on the screen of the LCD panel in a such manner that pixels are turned on/off by means of switching elements corresponding respectively to the pixels. The LCD control unit converts analog color signals from a host (e.g., a personal computer) into digital color signals and generates a horizontal output signal Vout and a dot (i.e., pixel) clock signal Dclk by using horizontal and vertical synchronization signals from the host. The LCD panel has an LCD driving unit therein. The digital color signals, dot clock signals and horizontal output signals, which are provided from the LCD control unit, are supplied to the LCD driving circuit incorporated in the LCD panel.

An earlier LCD control unit, which is provided to control the LCD panel, has a PLL (phase lock loop) circuit and an ADC (analog-to-digital converter). When the PLL circuit receives a horizontal synchronization signal Hsync, it generates a horizontal output signal Hout and a dot clock signal Dclk. Also the ADC circuit converts analog color signals of R (red), G (green) and B (blue) from the host into digital color signals of R, G and B respectively, which are supplied to the LCD driving circuit. The horizontal output signal Hout is produced from the horizontal synchronization signal Hsync, and the frequency of the horizontal output signal Hout is equal to that of the horizontal synchronization signal Hsync being fed to the PLL circuit and may be changed in accordance with the kinds of host, and the PLL circuit outputs a horizontal output signal Hout having the predetermined polarity. For example, in the earlier LCD device having the driving circuit which is operated in synchronism with a horizontal output signal Hout having a negative polarity, even though the horizontal synchronization signal Hsync of a positive polarity from the host is supplied to the PLL circuit in the LCD device, the PLL circuit supplies the horizontal output signal Hout of a negative polarity for the LCD driving circuit. The PLL circuit, as is well known in the art, has a phase sensor, a voltage controlled oscillator (VCO), a divider, and an output generator.

In general, the earlier LCD device embodies a single display mode, for example, a Video Graphics Array (VGA) mode, a Super VGA (SVGA) mode or an extended Graphics Array (XGA) mode. Accordingly, if the VGA mode video signals of 640×480 active resolution are provided to the XGA mode supporting LCD device having an active resolution of 1024×768, an image is displayed on only a partial area "A" of the LCD screen, and is not displayed on the remaining area "B". If SVGA mode signals having an active resolution of 800×600 are also provided to the XGA LCD device, the results are similar to the above case. Thus, one of several problems in the earlier LCD device is that, if low-resolution display mode signals from the host are fed to an LCD device capable of supporting a high-resolution display mode, an image is displayed on only a portion of only the LCD screen.

The following patents each disclose features in common with the present invention but do not teach or suggest the specifically recited features of the present invention: U.S. Pat. No. 5,528,740 to Hill et al., entitled Conversion Of Higher Resolution Images For Display On A Lower-Resolution Display Device, U.S. Pat. No. 5,535,018 to Yamano et al., entitled Information Processing Apparatus, U.S. Pat. No. 5,557,691 to Izuta, entitled Image Processing System, U.S. Pat. No. 5,568,597 to Nakayama et al, entitled Adapting Image Data Resolution To Match Resolution Of An Output Device, U.S. Pat. No. 5,612,715 to Karaki et al., entitled System And Method For Dynamically Adjusting Display Resolution Of Computer Generated Displays, U.S. Pat. No. 5,301,265 to Itoh, entitled Apparatus For Converting N Picture Elements To M Picture Elements, and U.S. Pat. No. 5,471,563 to Dennis et al., entitled System And Method For Automatic Resolution Reduction.

SUMMARY OF THE INVENTION

It is therefore an object of the present invention to provide a video signal converting apparatus which may convert a low-resolution video signal from a host into a different-resolution video signal capable of being displayed on the entire screen of a high-resolution supporting display device.

It is another object of the present invention to provide a display device in which, even though low-resolution display mode signals from a host are provided to the display device, the low-resolution display mode signals may be displayed on the entire screen thereof.

According to an aspect of the present invention, a liquid crystal display (LCD) device is provided to receive horizontal and vertical synchronization signals and at least one analog video signal synchronized with said horizontal video signal from a host and to display an image on a screen thereof. The LCD device comprises: a display mode discriminating means for discriminating a display mode supported by said host in response to said horizontal and vertical synchronization signals to generate first and second mode signals and first, second, third, fourth and fifth data signals related to said discriminated display mode; a clock generator for generating first and second pixel clock signals in synchronism with said horizontal synchronization signal, said first and second pixel clock signals having frequencies corresponding to said first and second data signals, respectively, a pulse number of said first pixel clock signal corresponding to one horizontal line being equal to a value of said first data signal, and a pulse number of said second pixel clock signal corresponding to one horizontal line being equal to a value of said second data signal; an analog-to-digital converter (ADC) for converting said at least one analog video signal into a digital video signal in synchronism with said first pixel clock signal; a memory for storing said digital video signal; a horizontal output generator for receiving said third and fourth data signals in response to said vertical synchronization signal and for generating a horizontal output signal, said digital video signal being read from said memory in synchronism with said horizontal output signal, a pixel number per one cycle of said horizontal output signal being equal to a value of said third data signal, and a pixel number per one cycle of said horizontal output signal being equal to value of said third data signal, and a pixel number per a pulse width of said horizontal output signal being equal to a value of said fourth data signal; and a memory controller for controlling reading and storing operations of said memory in accordance with said horizontal synchronization signal, said horizontal output signal, said third and fifth data signals, and said first and second pixel clock signals, said reading operation being delayed from a rising edge of said horizontal synchronization signal to a period corresponding to a value of said fifth data signal and then activated, whereby said reading and storing operations are not simultaneously activated.

According to the other aspect of the present invention, an apparatus for converting analog video signals of a first display into digital video signals of a second display, comprises: a memory for storing said digital video signals; a horizontal output generator for receiving first and second data signals and a horizontal synchronization signal and for generating a horizontal output signal for enabling said digital video signals corresponding to each horizontal line of said second display to be stored or read from said memory, a pixel number per one cycle of said horizontal output signal being equal to a value of said first data signal, and a pixel number per a pulse width of said horizontal output signal being equal to a value of said second data signal; and a memory controller for controlling reading and storing operations of said memory in accordance with said horizontal and vertical synchronization signals, said horizontal output signal, said first data signal, a third data signal determined according to frequencies of said horizontal and vertical synchronization signals, a first pixel clock signal for a write operation of said memory and a second pixel clock signal for a read operation of said memory.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
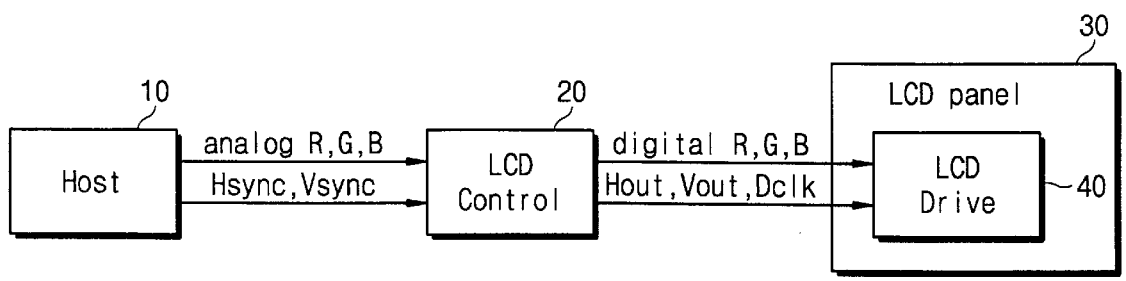
FIG. 1 is a schematic block diagram showing the construction of an active matrix LCD (liquid crystal display) device.

FIG. 1 is a schematic block diagram showing the construction of an active matrix LCD device as discussed in the Background of the Invention above. A host 10 is connected to an LCD control unit 20 which is in turn connected to an LCD driving circuit 40 of an LCD panel 30.

Figure 2:
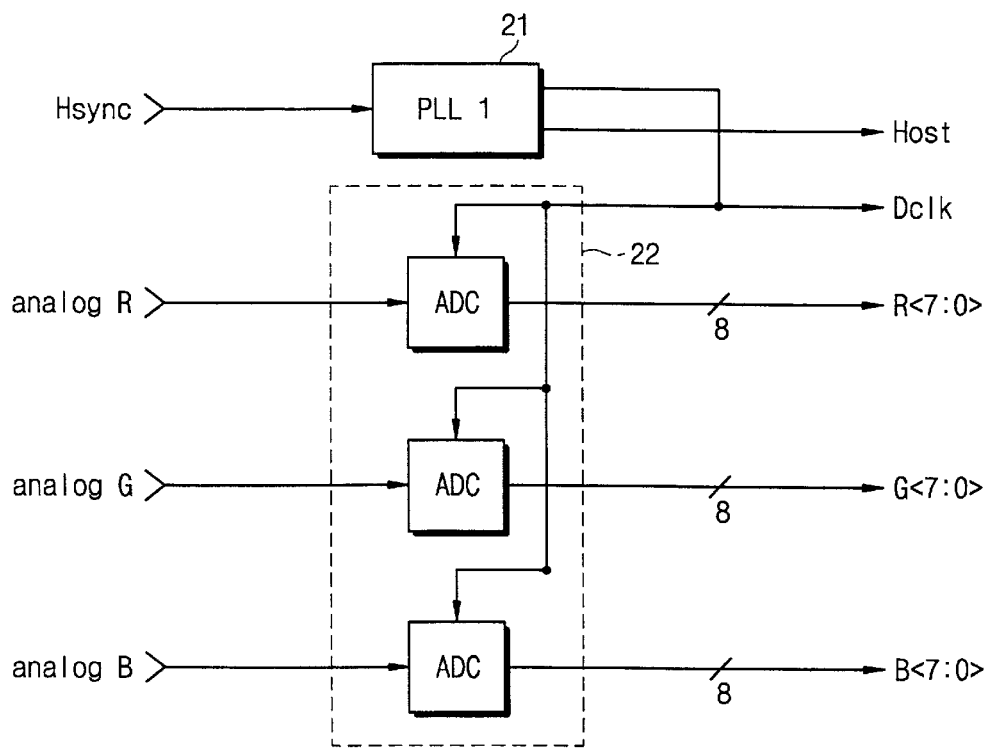
FIG. 2 is a block diagram showing the circuit construction of an earlier LCD control unit.

FIG. 2 is a block diagram showing the construction of an earlier LCD control unit as also previously discussed in the Background of the Invention above.

The LCD control unit 20, which is provided to control the LCD panel 30, has a PLL circuit 21 and an ADC 22. The PLL circuit 22, as is well known in the art, has a phase sensor, a voltage controlled oscillator, a divider, and an output generator.

It is assumed that a novel video signal converting apparatus according to the present invention is connected to an XGA mode supporting LCD panel and VGA mode video signals are fed from a host to the apparatus. The video signal apparatus then functions as an LCD controller. With the apparatus, the frequency of the vertical synchronization signal Vsync is kept constant therein, and also the frequencies of a horizontal synchronization signal Hsync and a dot clock signal Dclk are increasingly changed 0.6 with respect to each input frequency, as shown by table 1 below. As a result, an image of a VGA mode can be displayed on the whole screen of the LCD device having the resolution of the XGA mode.

TABLE 1

| | Before Conversion | | After Conversion | |
|---|---|---|---|---|
| Resolution (dots × lines) | Horizontal Frequency (Khz) | Vertical Frequency (Hz) | Horizontal Frequency (KHz) | Resolution (dots × lines) |
| 640 × 350 (800 × 449) | 31.50 | 70.0 | 50.40 | 1024 × 560 (1280 × 718) |
| 640 × 480 (800 × 525) | 31.50 | 60.0 | 50.40 | 1024 × 768 (1280 × 840) |
| 640 × 400 (800 × 449) | 31.50 | 70.0 | 50.40 | 1024 × 640 (1280 × 718) |
| 640 × 350 (800 × 520) | 37.87 | 72.8 | 60.59 | 1024 × 768 (1331 × 832) |

In table 1, the resolution represents the active resolution, the value in the parentheses represents the total resolution.

As shown in table 1, for example, the ratio of the resolution after conversion to the resolution before conversion is 1:1.6, since the resolution of 640×480 is converted into 1024×768. With this conversion method, color signals of R, G and B corresponding to 5 lines are changed into color signals corresponding to 8 lines.

Next, if the SVGA mode signals are fed to the LCD controller (i.e., the video signal converter) according to this embodiment, the frequency of the vertical synchronization signal Vsync is kept constant, and the frequency of the horizontal signal Hsync and that of the dot clock signal Dclk is increased 0.25 times with respect to each input frequency, as shown in table 2 below. As a result, the image can be almost displayed in the resolution of the XGA mode on the LCD screen.

| | Before Conversion | | After Conversion | |
|---|---|---|---|---|
| Resolution (dots × lines) | Horizontal Frequency (Khz) | Vertical Frequency (Hz) | Horizontal Frequency (KHz) | Resolution (dots × lines) |
| 800 × 600 (1024 × 625) | 31.16 | 56.2 | 43.95 | 1000 × 750 (1280 × 781) |
| 800 × 600 (1056 × 628) | 37.88 | 60.3 | 47.35 | 1000 × 750 (1320 × 785) |
| 800 × 600 (1056 × 628) | 48.08 | 72.0 | 60.10 | 1000 × 750 (1320 × 785) |

In table 2, the resolution represents the active resolution, and the value in the parentheses represents the total resolution.

As shown in table 2, for example, the ratio of the resolution after conversion to the resolution before conversion is 1:1.28, since the resolution of 800×600 is converted into the resolution of 1000×750. As a matter of convenience for conversion, however, the ratio of the resolution after conversion to the resolution before conversion is established at 1:1.25. In accordance with this conversion process, color signals corresponding to 4 lines are converted into color signals corresponding to 5 lines.

Figure 3:
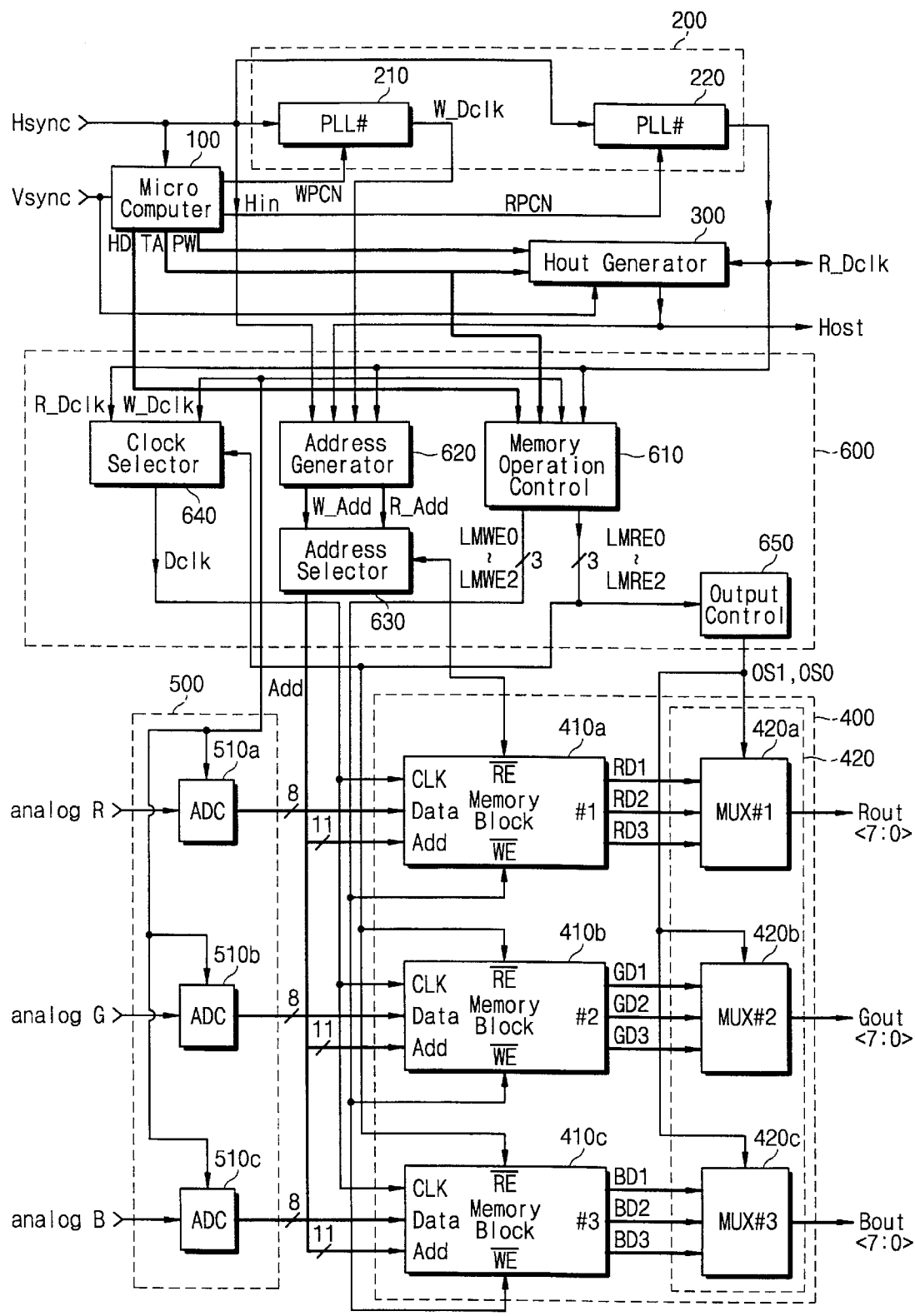
FIG. 3 is a block diagram showing the circuit construction of a novel video signal converting apparatus according to the principles of the present invention.

FIG. 3 shows the circuit construction of the video signal converting apparatus which converts the VGA or SVGA mode signals into XGA mode signals according to the principles of the present invention.

Referring to FIG. 3, the video signal converting apparatus comprises a microcomputer 100, a clock generator 200, a horizontal output generator 300, a memory section 400, an analog-to-digital (ADC) converter circuit 500 and a memory controller 600.

The horizontal signal Hsync and the vertical synchronization signal Vsync from the host are provided to the microcomputer 100. The microcomputer 100 discriminates the display mode supported by the host (hereinafter, referred to as "host supporting display mode") by using the horizontal signal Hsync and the vertical synchronization signal Vsync, and generates a first data signal HD indicative of time interval, a second data signal TA indicative of the number of pixels per cycle of the horizontal output signal $H_{out}$, and a third data PW signal indicative of the pulse width of the horizontal output signal $H_{out}$.

Besides the above data signals, the microcomputer 100 generates two data signals which are used to control write and read operations of the memory section 400, one of which is a data signal WPCN indicative of the number of pixel clocks (i.e., the number of pixel clocks per horizontal line according to the resolution the detected host display mode) required to write video information of one horizontal line in the memory section during a write operation, and the other is a data signal RPCN indicative of the number of pixel clocks (i.e., the number of pixel clocks per horizontal line according to the resolution of the LCD supporting display mode) required to read video information of one horizontal line from the memory section during a read operation. If the VGA mode is supported by the host 10, each value of the data signals WPCN and RPCN is determined to be in the range of 1000 to 2500 in accordance with the horizontal and vertical frequencies. If the SVGA mode is supported by the host 10, each value of the data signals WPCN and RPCN is determined to be in the range of 1000 to 2000 in accordance with the horizontal and vertical frequencies.

As described above, the microcomputer 100 detects the number of pixels of the video signal (i.e., the resolution of the video signal) from the host by using the horizontal and vertical synchronization signals and compares the detected number of pixels (i.e., the detected resolution) with the predetermined reference number of pixels (i.e., the predetermined reference resolution).

The clock generator 200 comprises two PLL circuits 210 and 220 which are respectively initialized by the signals WPCN and RPCN from the microcomputer 100, and which generate the write and read dot clock signals W_Dclk and R_Dclk for the memory write and read operations, respectively. The clock signals W_Dclk and R_Dclk have frequencies corresponding to the signals WPCN and RPCN in synchronism with the horizontal output signal Hout.

The horizontal output generator 300 generates the horizontal output signal Hout by using the vertical synchronism signal Vsync from the host and the data signals TA, PW, WPCN and RPCN from the microcomputer 100. The horizontal output signal Hout is generated in synchronization with the horizontal synchronization signal Vsync (hereinafter, referred to as "Hin").

Turning again to FIG. 3, the video signal converting apparatus of the present invention has the memory section 400 and the ADC circuit 500 which is provided to convert an analog video signal of a serial format (i.e., analog color signals) into a digital video signal of a parallel format (i.e., digital color data signals). The memory section 400, which is provided between the ADC circuit 500 and the LCD driver 40, has three memory blocks 410a, 410b and 410c corresponding to signals of R, G and B and an output selector 420. Each of memory blocks 410a, 410b and 410c has at least three line memories.

The analog video signal from the host is sampled by the ADC circuit 500 in synchronization with the clock signal W-Dclk having a frequency which is determined by a difference between the resolution of the analog video signal detected by the microcomputer 100 and the resolution supported by the LCD panel. That is, the ADC circuit 500 is provided to convert a serial video signal for the CRT display apparatus of the host into a parallel video signal for the LCD device.

The horizontal synchronization signal Hin, the clock signals W-Dclk and R-Dclk from the clock generator 200 and the horizontal output signal Hout from the horizontal output generator 300 are supplied to a memory controller 600, The memory controller 600 has, as shown in FIG. 3, a memory operation control circuit 610 an address generator 620, an address selector 630, a clock selector 640 and an output control logic circuit 650.

The memory operation control circuit 610 receives the data signals HD and TA from the microcomputer 100 and the clock signals W_Dclk and R_Dclk from the clock generator 200 to generate two groups of line memory enable signals, one group LMWE0–LMWE2 which is provided to select line memories performing the write operation of the line memories, and the other group LMRE0–LMRE2 which is provided to select line memories performing the read operation of the line memories.

The address generator 620 is provided to generate address signals W_Add Add and R-Add for write and read operations of the memory section, and the address selector 630 is provided to select the address signals W_Add and R_Add and provide the selected address signal to the corresponding line memories LM0–LM2 (shown in FIG. 7) of each of the memory blocks 410a, 410 band 410c. The clock selector 640 selects one of the clock signals W_Dclk and R_Dclk and provides the selected clock signal to the line memories of each memory block.

The output control circuit 650 generates output selection signals OS0 and OS1 in response to the enable signals. The selection signals are provided to an output selector 420 of the memory section 400 so that data signals read from the line memories LM0–LM2 are selectively output by the output selector 420. It can be understood that the number of output selection signals is varied depending on the number of line memories constituting one memory block.

In this example, the horizontal output generator 300, the memory section 400 and the memory controller 600 may be constituted by a single chip. Thus, the video signal converting apparatus has a compact structure.

Figure 4:
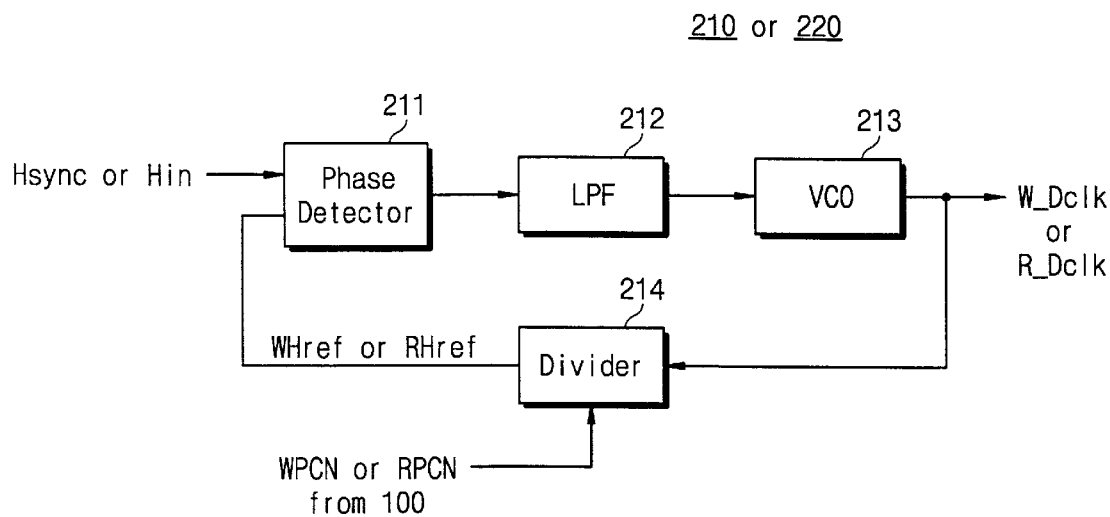
FIG. 4 is a detailed circuit diagram of the PLL circuit of the clock generator shown in FIG. 3.
Figure 5:
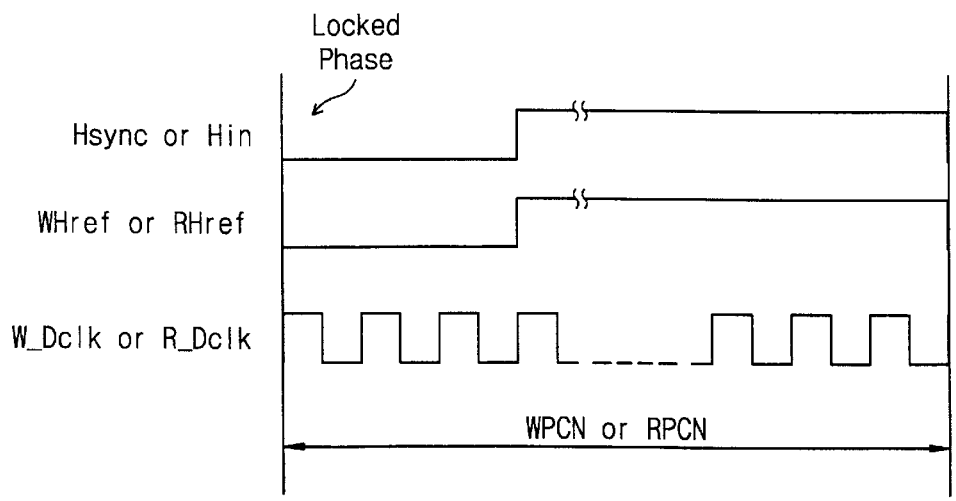
FIG. 5 is a timing diagram for explaining the operation of the PLL circuit shown in FIG. 4.

As shown in FIG. 4, each of the PLL circuits 210 and 220 in the clock generator 200 comprises a phase detector 211, a low pass filter 212, a VCO (voltage controlled oscillator) 213 and a divider 214. In the PLL circuit 210 for a memory write operation, the divider 214 receives the data signal WPCN from the microcomputer 100 and generates a write horizontal reference signal WHref. The phase detector 211 generates a DC voltage signal which varies in accordance with a phase difference between the horizontal synchronization signal Hsync from the host and the reference signal VHref. The DC voltage signal is provided to the low pass filter 212 so that noise contained in the DC voltage signal is filtered out. The VCO 213 generates, as shown in FIG. 5, an in-phase clock signal as the clock signal W_Dclk. The in-phase clock signal has a frequency corresponding to the level of the DC voltage signal supplied through the low pass filter 212.

Similar to the PLL circuit 210 described above, the PLL circuit 220 for a memory read operation receives the data signal RPCN from the microcomputer 100 and then generates the clock signal R_Dclk.

Figure 6:
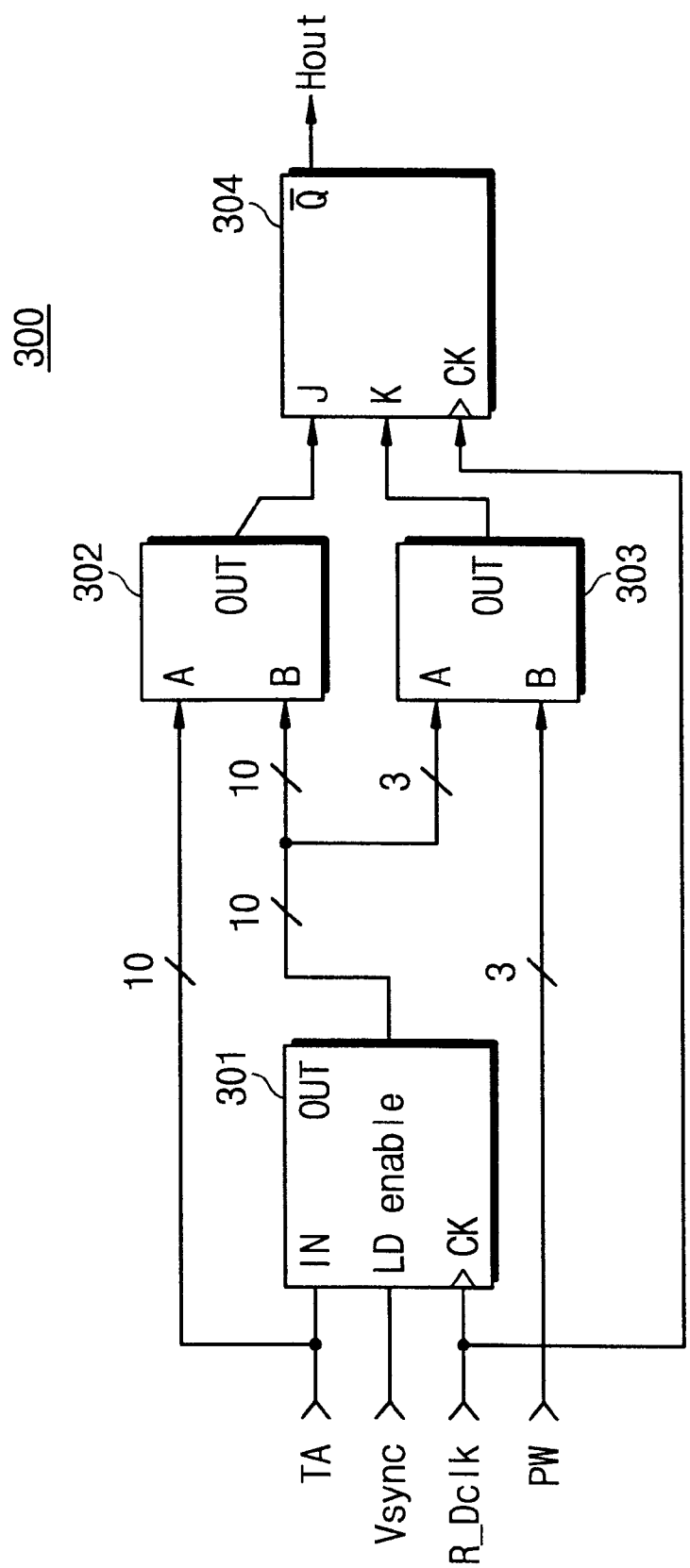
FIG. 6 is a circuit diagram of the horizontal output generation circuit shown in FIG. 3.

With reference to FIG. 6, the horizontal output generator 300 has a down counter 301, two comparators 302 and 303 and a JK flip-flop 304. The down counter loads the data signal TA of ten bits from the microcomputer in response to the vertical synchronization signal Vsync and counts down the loaded values at each rising edge of the read pixel clock R_Dclk. When the down counter 301 has an output count value of zero, the data signal TA is loaded therein. Comparator 302 outputs a high level signal, when the value of the data signal TA is equal to the output count value of down counter 301. At that time, a low level signal is fed from the negative output terminal $\overline{Q}$ of the JK flip-flop 304. Comparator 303 outputs a high level signal, when the value of the three least significant bits of the output count value of down counter 301 is equal to the value of three bits of the data signal PW from the microcomputer 100. At this time, the output $\overline{Q}$ of the JK flip-flop 304 is inverted to a high level. When down counter 301 counts down to zero, the data signal TA is again loaded into the down counter 301, at which time comparator 302 again outputs a high level signal, and the $\overline{Q}$ output of JK flip-flop 304 is again a low level.

Figure 7:
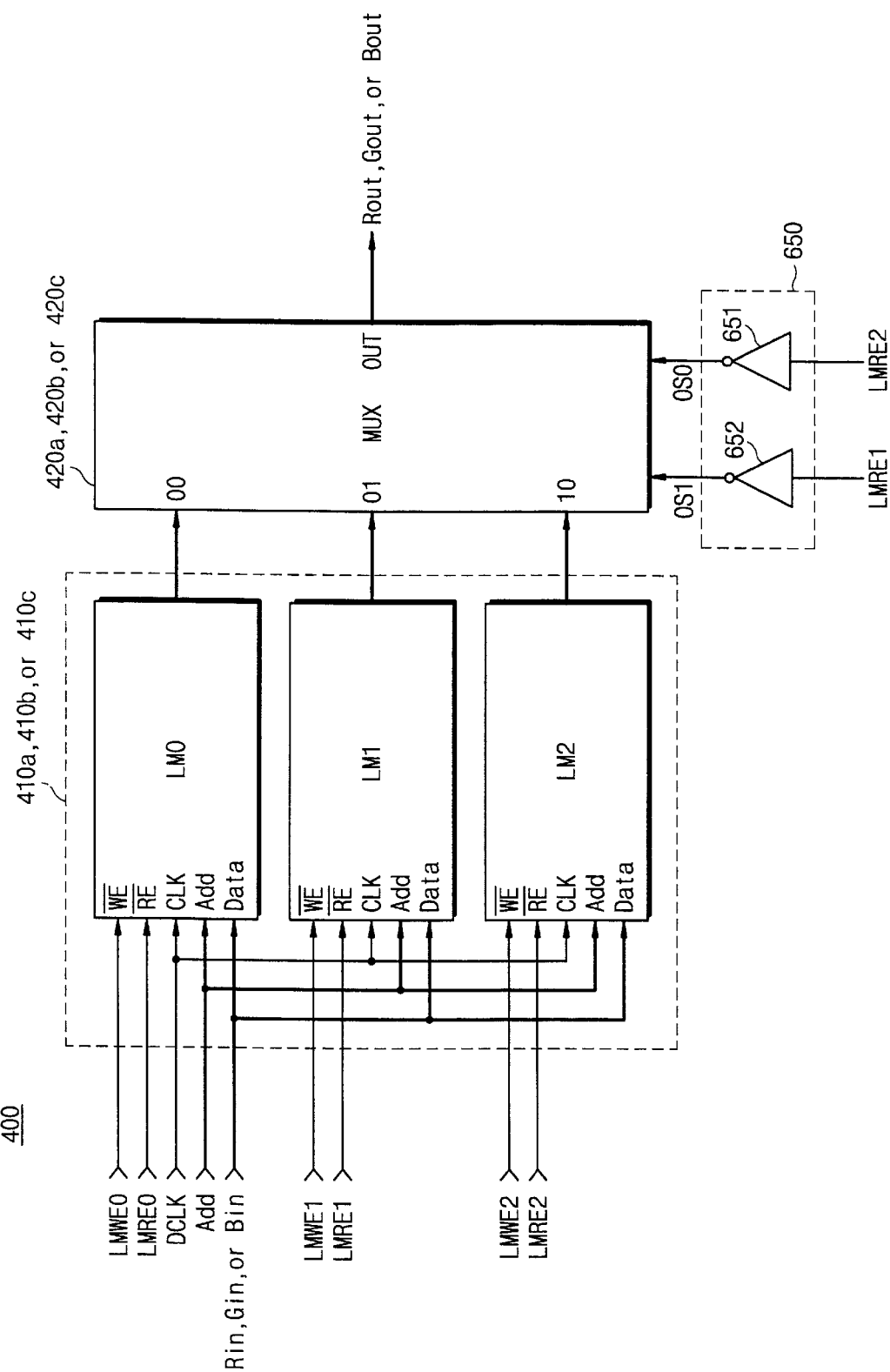
FIG. 7 is a block diagram showing the circuit construction associated with the memory blocks shown in FIG. 3.

FIG. 7 shows the connection of one of the memory blocks 410a, 410b and 410c, between one of the output selectors 420a, 420b and 420c, and the output control logic circuit 650. Each of the memory blocks 410a, 410b and 410c has three line memories LM0, LM1 and LM2. Each line memory has at least 1344 words×8 bits of storage capacity. The line memory enable signals LMWE0–LMWE2 and LMRE0–LMRE2 from the memory operation control circuit 610 are supplied to the line memories LM0–LM2. The address signal selected by the address selector 630, the color signals $R_{in}$, $G_{in}$ and $B_{in}$ from the ADC circuit 500 and the pixel clock signal Dclk selected by the clock selector 640 are also supplied to each line memory. The output selector 420 is constituted by three 3×1 multiplexers 420a, 420b and 420c, each of which has three inputs which are respectively connected to data output ports of the line memories LM0, LM1 and LM2 in each memory block.

The output control logic circuit 650 is constituted by two inverters 651 and 652 which enable the read enable signals LMRE2 and LMRE1 of the most significant two bits from the memory operation control circuit 610 to be inverted. Each of the multiplexers 420a, 420b and 420c outputs one of the outputs of the line memories LM0, LM1 and LM2 of each memory block in response to the output selection signals SO0 and SO1 from, the output control logic circuit 650. Outputs $R_{out}$, $G_{out}$ and $B_{out}$, of the multiplexers 420a, 420b and 420c are supplied to the LCD driver 40.

In this example, it is illustrated that the outputs of the line memories are selected by the multiplexers in response to the output selection signals. It can be also seen that the outputs of the line memories are directly selected in response to the read enable signals LMRE1 and LMRE2.

Figure 8:
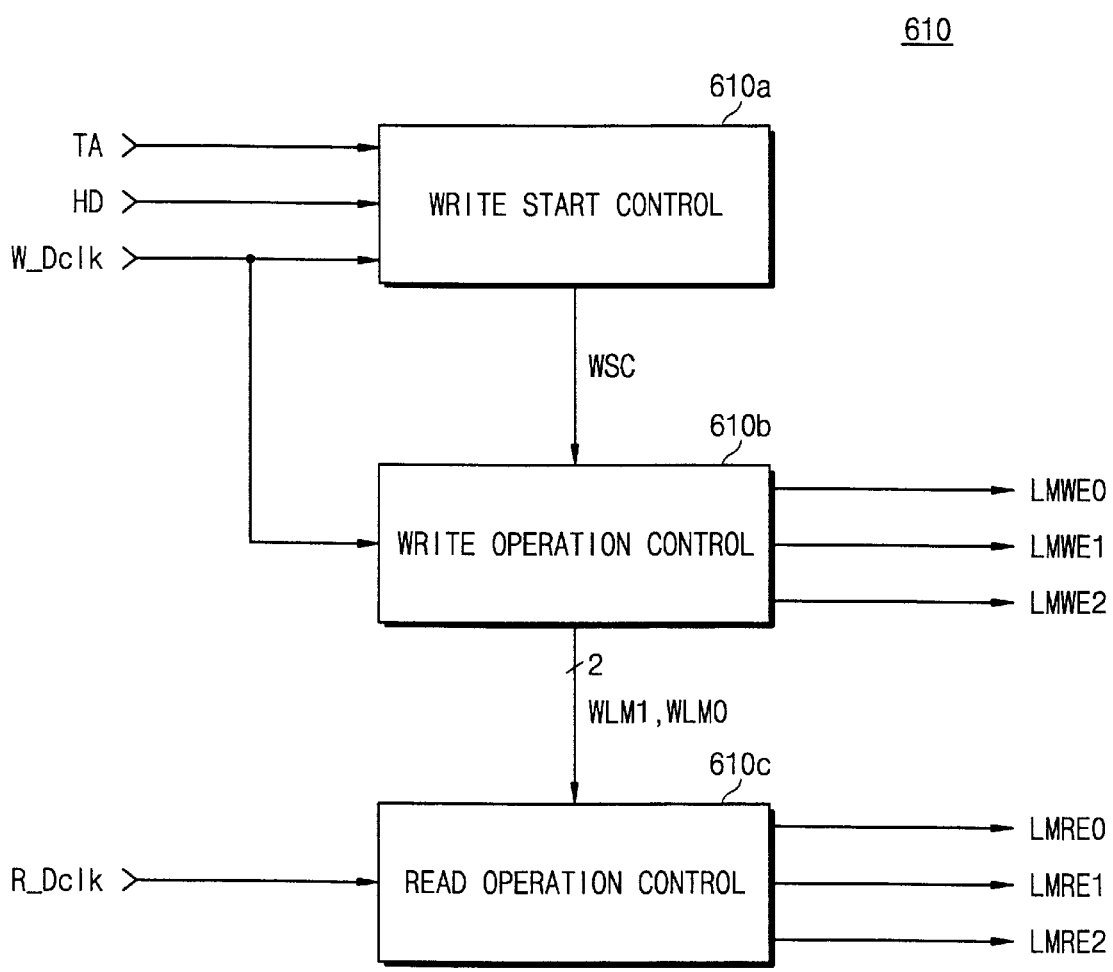
FIG. 8 is a circuit diagram of the memory operation control circuit shown in FIG. 3.
Figure 9:
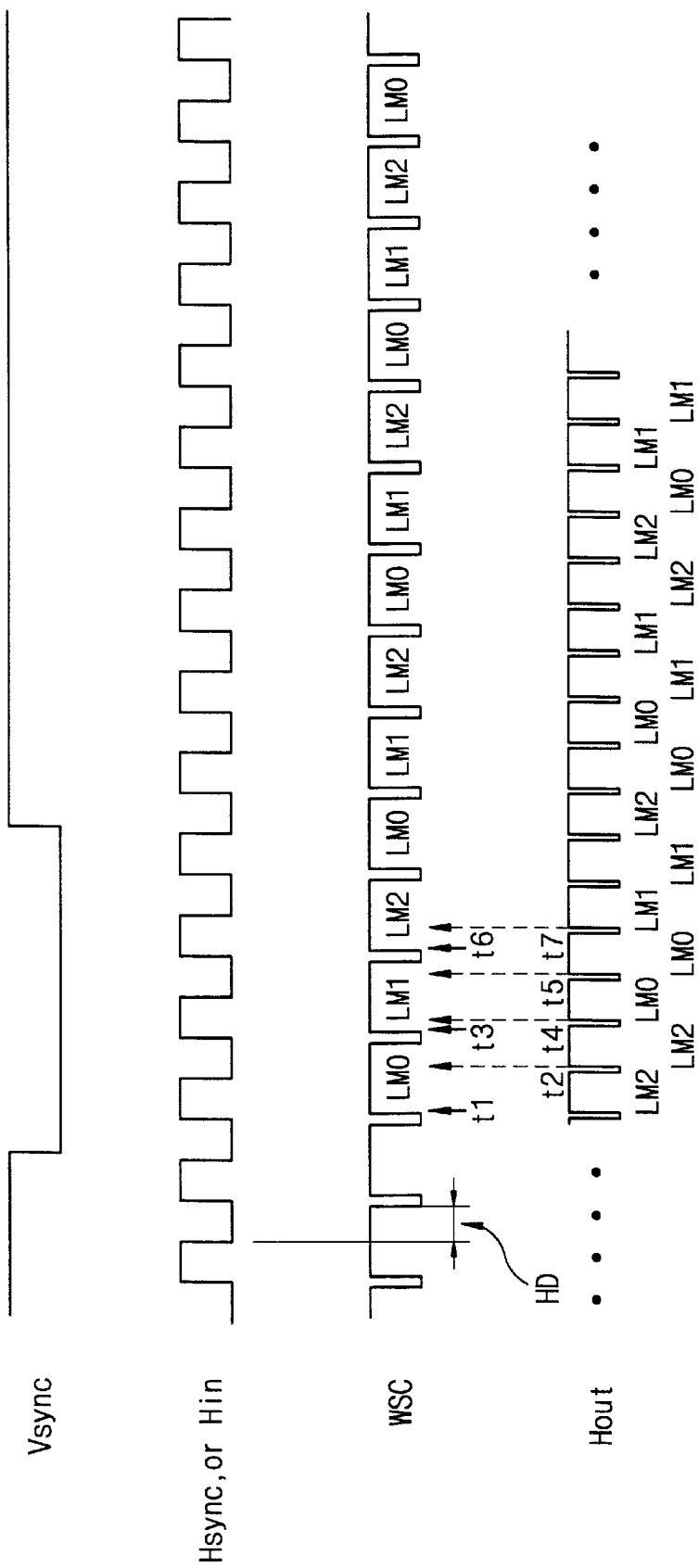
FIG. 9 is a timing diagram for explaining the read and write operations of the line memories shown in FIG. 8.

Referring to FIG. 8, the memory operation control circuit 610 comprises a write start control circuit 610a, a write operation control circuit 610b and a read operation control circuit 610c. The write start control circuit 610a generates a write start control signal WSC, which is used to control a write operation of the line memories, in response to the data signals TA and HD from the microcomputer 100 and the write pixel clock signal W_Dclk. The WSC signal has the same frequency as the frequency of the horizontal synchronization signal $H_{in}$ and has a phase retarded by a value of the data signal HD as compared with the phase of the horizontal synchronization signal, as shown in FIG. 9. There is a phase difference between the horizontal synchronization signal and the WSC signal, and thus the read and write operations are not simultaneously performed. As a result, memory designation error can be prevented.

The write operation, control circuit 610 generates write enable signals WLME0–WLME2 corresponding to the line memories LM0–LM2 and memory index signals WLM0–WLM1 in response to the write pixel clock signal W_Dclk and the write start control signal WSC. The memory index signals WLM0–WLM1 indicate the line memories which are enabled to be written, The read operation control circuit 610 generates read enable signals LMRE0–LMRE2 corresponding to each line memory in response to the read pixel clock signal R_Dclk from the clock generator 200 and the memory index signals WLM0 and WLM1

FIG. 9 is a timing diagram for explaining the read and write operations of the line memories shown in FIG. 8.

In FIG. 9, line memories for write operation in each memory block are selected at a rising edge of the write start control signal WSC and line memories for read operation therein are selected at a rising edge of the horizontal output signal Hout. Also, in the line memories for write operation, the line memory LM0 is first selected, and afterward the line memories LM1 and LM2 are sequentially selected. Particularly, The line memories for read operation are selected depending on the line memories selected for write operation. If the line memory LM2 is used for write operation, the line memory LM1 is selected for read operation, and if the line memory LM1 is used for write operation, the line memory LM0 is selected for read operation. And, if the line memory LM0 is used for write operation, the line memory LM2 is selected for read operation.

So as to achieve memory selection described immediately above, the data signal HD indicating the time interval which is provided from the microcomputer 10 must be adjusted. By adjusting the time interval signal HD, rising edges of the horizontal synchronization and output signals Hin and Hout (i.e., rising edges of write start control signals WSC for selected line memories) do not occur at the same time. If line memories for read and write operations are simultaneously selected, a selection error may be generated. In this example, the line memories for read and write operations are not selected at the same time in accordance with the time interval signal HD. The microcomputer 100 detects a host supporting display mode, e.g. resolution of the host to by using the horizontal and vertical synchronization signals Hin and Hsync, and generates the time interval signal HD in accordance with the detected resolution.

Referring again to FIG. 9, after the presence of the vertical synchronization signal Vsync, the line memory LM0 for write operation is selected at a first rising edge of the horizontal synchronization signal Hin i.e, a time of t1. The line memory LM2 for read operation is selected at a first rising edge of the horizontal output signal Hout.

At a second rising edge, i.e. a time of t2 of the horizontal output signal Hout, since the line memory LM1 continues to be used for write operation, the line memory LM2 is selected for read operation once more.

At a second rising edge, i.e. a time of t3 of the horizontal synchronization signal Hin, the line memory LM1 is selected for write operation, Subsequently, at a third rising edge, i.e. a time of t4 of the horizontal output signal Hout, since the line memory LM1 continues to be used for write operation, the line memory LM0 is selected for read operation.

At a fourth rising edge, i.e. a time of t5 of the horizontal output signal Hout, since the line memory LM1 continues to be used for write operation, the line memory LM0 is selected for read operation once more.

As described immediately above, at a certain time, if a line memory during write operation is commanded to perform a read operation, then the line memory whose read operation has just previously been completed performs the read operation once more.

At a third rising edge, i.e. a time of t6 of the horizontal synchronization signal Hin, the line memory LM2 is selected for write operation. As a result, at a fifth rising edge, i.e. a time of t7, the line memory LM1 is selected for read operation.

Figure 10:
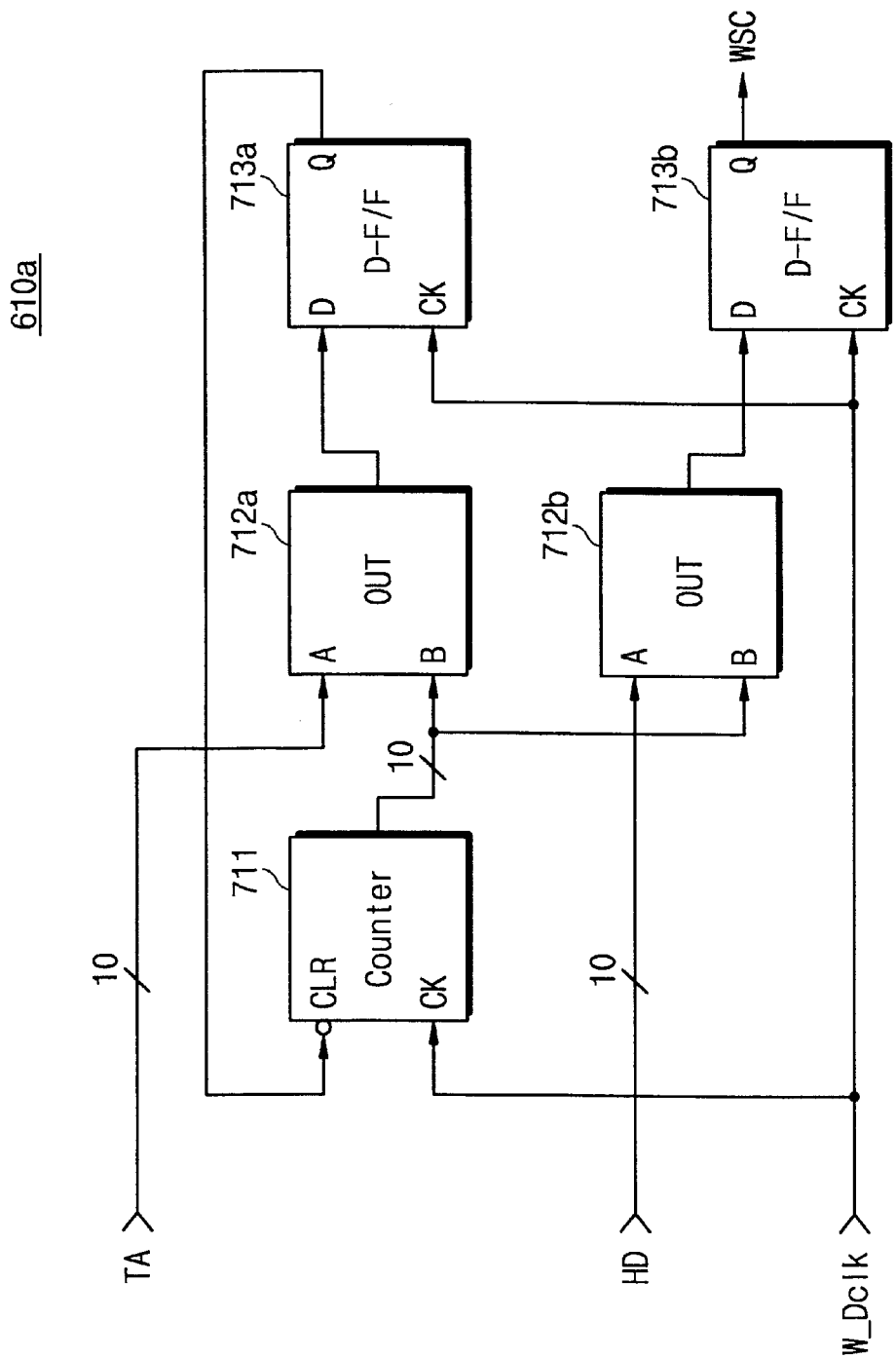
FIG. 10 is a circuit diagram of the write start control circuit shown in FIG. 8.

FIG. 10 shows the write start control circuit 610*a* of FIG. 8. Referring to FIG. 10, the write start control circuit 610*a* has an up-counter 711, comparators 712*a* and 712*b*, and D flip-flops 713*a* and 713*b*. The counter 711 and the flip-flops 713*a* and 713*b* are operated in synchronism with the write pixel clock signal W_Dclk.

A 10-bit count signal is outputted from the counter 711 which counts the number of pixels corresponding to one period of a write start control signal WSC. The data signal TA from the microcomputer 100 and the output data signal of the counter 711 are respectively supplied to two input terminals A and B of the comparator 712*a*. Two input terminals of the comparator 712*b* are respectively provided with the data signal HD from the microcomputer 100 and the output data signal of the counter 711. Each of the comparators 712*a* and 712*b* outputs an output signal of a high level when the data values of the two input signals are identical but outputs an output signal of a low level when the values of the two input signals are different. The output signals of the comparators 712*a* and 712*b* are provided to the input terminals of the D flip-flops 713*a* and 713*b*, respectively. The output signal of the flip-flop 713*a* is supplied to the clear terminal CLR of the counter 711. The counter 711 is cleared by the flip-flop 713*a* when the data TA is identical with the output of the counter 711. D flip-flop 713*b* receives the output signal of the comparator 712*b*, maintains the received signal and generates the write start control signal WSC synchronized with the write pixel clock signal W-Dclk. The write start control signal WSC is provided to the write operation control circuit 610*b*.

Figure 11:
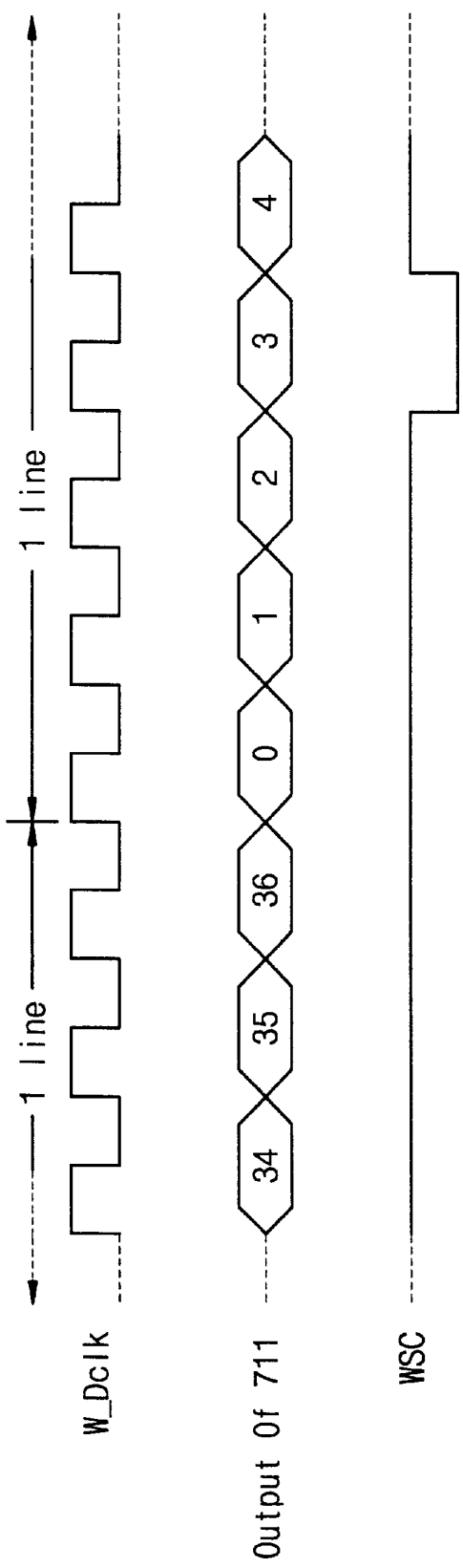
FIG. 11 is a timing diagram for explaining the write start operation of the write start control circuit shown in FIG. 10.

FIG. 11 is an operation timing diagram of the write start control circuit 610*a* of. FIG. 10, when the frequency of the data signal TA is identical with that of the horizontal synchronization signal and the values of the data TA and HD are 36 and 2, respectively. Referring to FIGS. 10 and 11, when the output of the counter 711 is 3, that is, in the fourth period of the write pixel clock signal W_Dclk, the write start control signal of a low level is generated by the circuit 610*a*.

Figure 12:
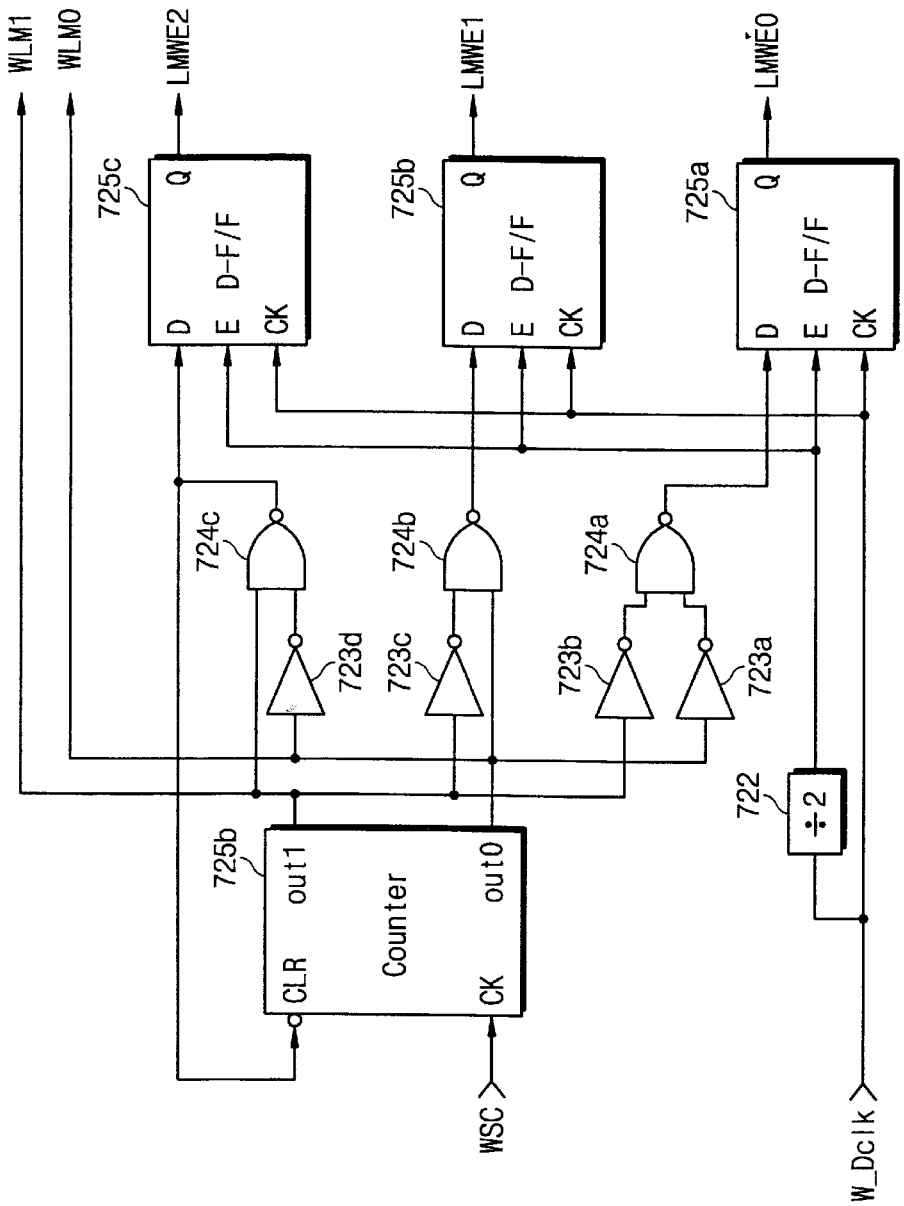
FIG. 12 is a circuit diagram of the write operation control circuit shown in FIG. 8.

FIG. 12 shows the write operation control circuit 610*b* of FIG. 8. As shown in FIG. 12, the write operation control circuit 610*b* comprises an up-counter 721, a frequency divider 722, inverters 723*a*, 723*b*, 723*c* and 723*d*, NAND gates 724*a*, 734*b* and 724*c*, and D flip-flops 725*a*, 725*b* an 725*c*. To the clock terminal CK of the counter 721, the write start control signal WSC from the write start control circuit 610*a* is supplied. The counter 721 generates memory index signals WLM1 and WLM0 in order to rotatively select line memory LM0, LM1, or LM2, which is to be written. The frequency divider 522 produces an output signal that is exactly one half the frequency of the input signal, i.e., the write pixel clock signal W_Dclk. The input terminals of the inverters 723*a* and 723*d* are commonly connected to one output terminal OUT0 of the counter 72 1, and those of the inverters 723b and 723c to the other output terminal OUT1 thereof one input terminal of the NAND gate 724a is connected to the output terminal of the inverter 723a, and the other input terminal thereof is connected with the output terminal of the inverter 723b. One input terminal of the NAND gate 724b is connected to the output terminal OUT0 of the counter 721, and the other input terminal thereof to the output terminal of the inverter 723c. One input terminal of the NAND gate 724c is connected to the output terminal of the inverter 723d, and the other input terminal thereof to the output terminal OUT1 of the counter 721. The inverters 723a–723d and NAND gates 724a–724c serve as a decoder circuit that detects which line memory is selected by the counter 721 for a write operation. On the other hand, the inverter 723d and NAND gate 724c also serve as counter control circuit that makes the counter 721 clear when the logic values of the output signals WLM1 and WLM0 the counter 721 are I and 0, respectively. The respective input terminals Ds of the flip-flops 725a–725c are respectively connected to the output terminals of the NAND gates 724a–724c. Each of the clock terminals CKs of the flip-flop 725a–725c is supplied with the write pixel clock signal W_Dclk. The flip-flops 725a–725c are enabled by the frequency divider 722 so as to respectively generate write enable signals LMWE0, LMWE1 and LMWE2.

Figure 13:
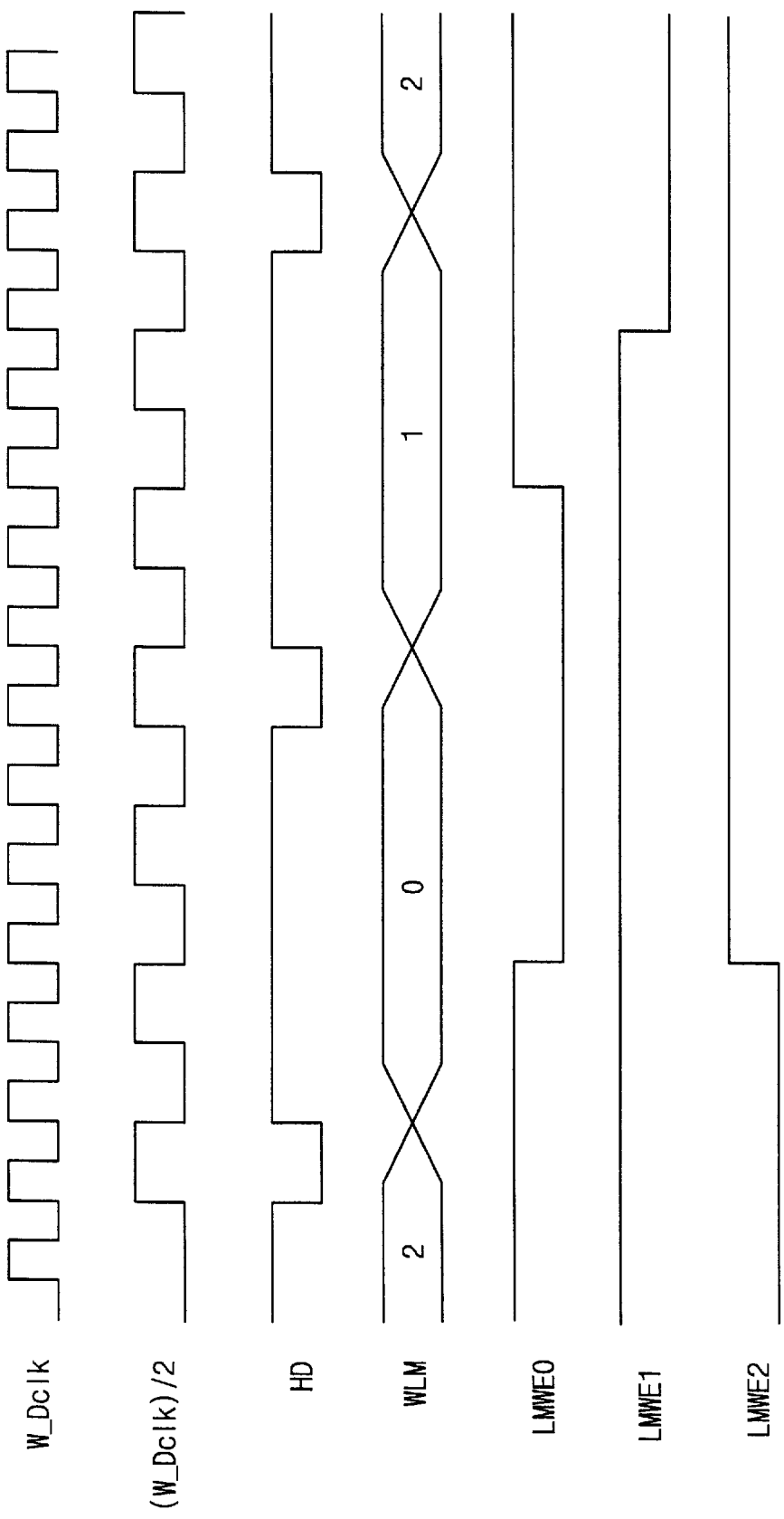
FIG. 13 is a timing diagram for explaining the write operation of the write operation control circuit shown in FIG. 12.

FIG. 13 shows an operation timing of the write operation control circuit 610b of FIG. 12. Referring to FIG. 13, when the line memory LM2 is selected by the memory index signals WLM1 and WLM0, the write enable signal LMWE2 becomes active. The write enable signal LMWE0 becomes active when the line memory LM0 is selected by the signals WLM1 and WLM0, and the write enable signal LMWE1 becomes active when the line memory LM0 is selected.

Figure 14:
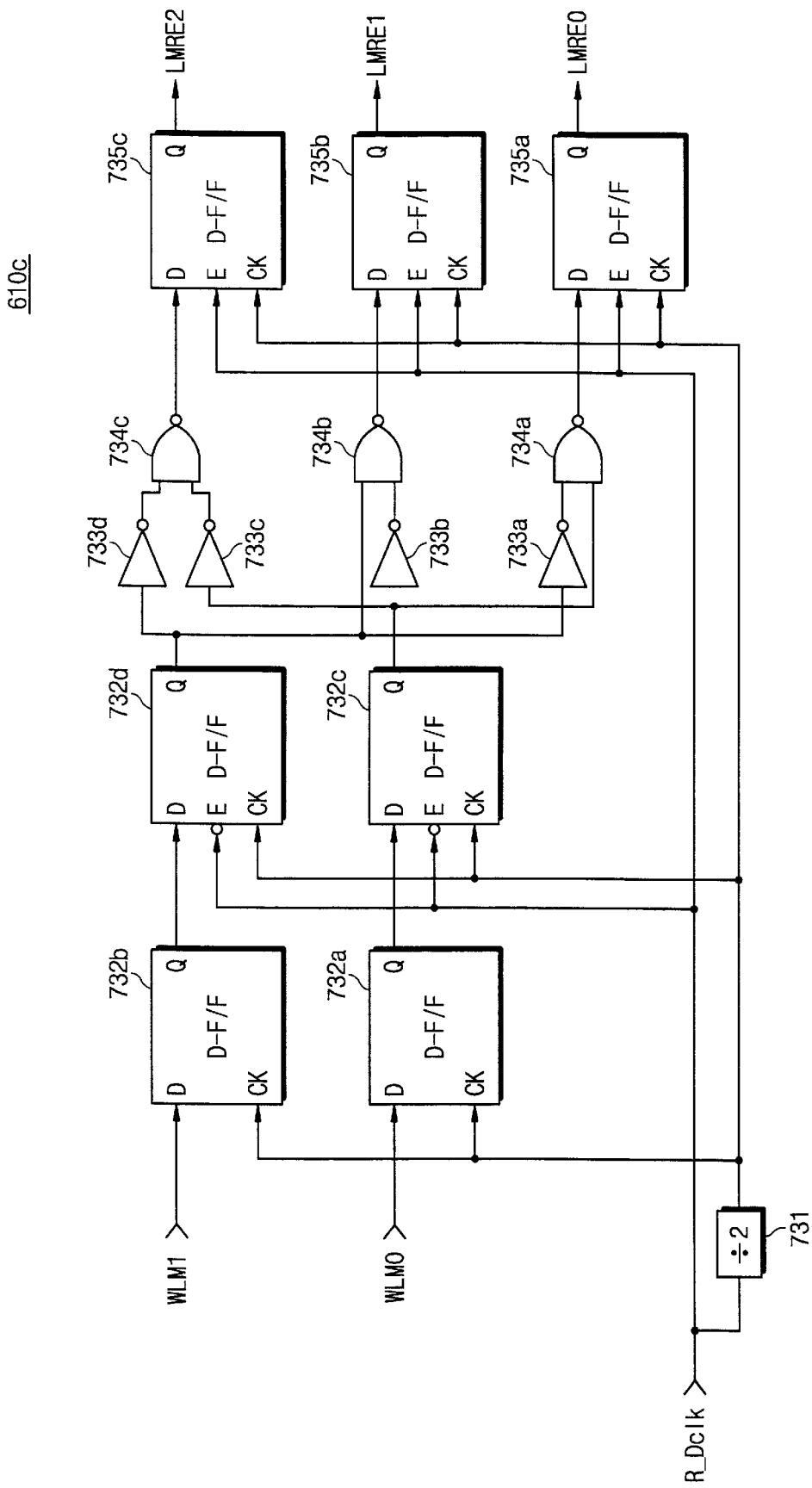
FIG. 14 is a circuit diagram of the read operation control circuit shown in FIG. 8.

FIG. 14 shows the read operation control circuit 610c of FIG. 8. As illustrated in FIG. 14, the read operation control circuit 610c comprises a frequency divider 731, D flip-flops 732a, 732b, 732c, 732d, 735a, 735b and 735c, inverters 733a, 733b, 733c and 733d, and NAND gates 734a, 734b and 734c. The frequency divider 731 receives the read pixel clock signal R_Dclk and generates an output signal that is exactly one half the frequency of the received signal, The output signal of the divider 731 is supplied to the clock terminals CKs of the flip-flops 732a, 732b, 732c, 732d, 735a, 735b and 735c, commonly. The input terminals Ds of the flip-flop 732a and 732b are supplied with the memory index signals WLM0 and WLM1, respectively. The output terminals Qs of the flip-flops 732a and 732b are respectively connected to the input terminals Ds of the flip-flips 732c and 732d. To the enable terminals Es of the flip-flops 732c and 732d, the read pixel clock signal R_Dclk is supplied. The output terminal Q of the flip-flop 732c is commonly connected to the input terminals of the inverters 733b and 733c, and that of the flip-flop 732d is connected to those of the inverters 733a and 733d commonly. Two input terminals of the NAND gate 724a are connected to the output terminal Q of the flip-flop 732c and the output terminal of the inverter 733a, respectively. One input terminal of the NAND gate 734b is connected to the output terminal of the inverter 733b and its the other input terminal to the output terminal of the flip-flop 732d. One input terminal of the NAND gate 734c is connected to the output terminal of the inverter 733c and its the other input terminal the output terminal of the inverter 733d. The inverters 733a–733d and NAND gates 734a–734c serve as a decoder circuit that detects which line memory is selected for a read operation, and selects line memories as noted above with reference to FIG. 9. Input terminals Ds of the flip-flops 735a–735c are respectively connected to the output terminals of the NAND gate 734a–734c and the enable terminals Es thereof are supplied with the read pixel clock signal R_Dclk. The flip-flops 735a–735c are enabled by the read pixel clock signal R_Dclk to generate the read enable signals LMRE0, LMRE1 and LMRE2, respectively.

Figure 15:
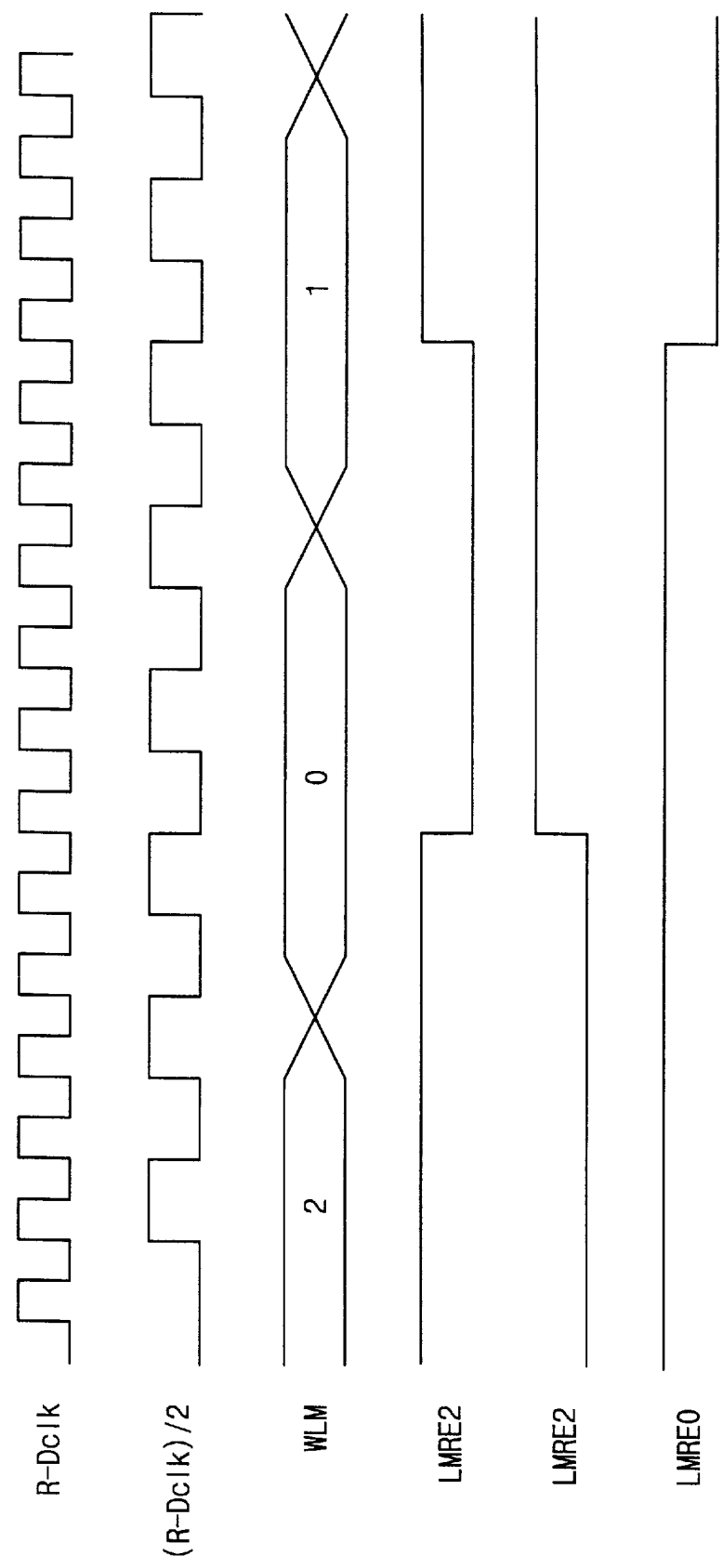
FIG. 15 is a timing diagram for explaining the read operation of the read operation control circuit shown in FIG. 14.

FIG. 15 shows an operation timing of the read operation control circuit 610c of FIG. 14. Referring to FIG. 15, when the memory index signals WLM1 and WLM0 indicate the line memory LM2, the read enable signal LMRE1 becomes active. Namely, during the write operation of the line memory LM2, the line memory LM1 is indicated as a line memory for a read operation. The read enable signal LMRE2 becomes active when the memory index signals WLM1 and WLM0 indicate the line memory LM0 and the read enable signal LMRE0 becomes active when the memory index signals WLM1 and WLM0 indicate the line memory LM1.

Figure 16:
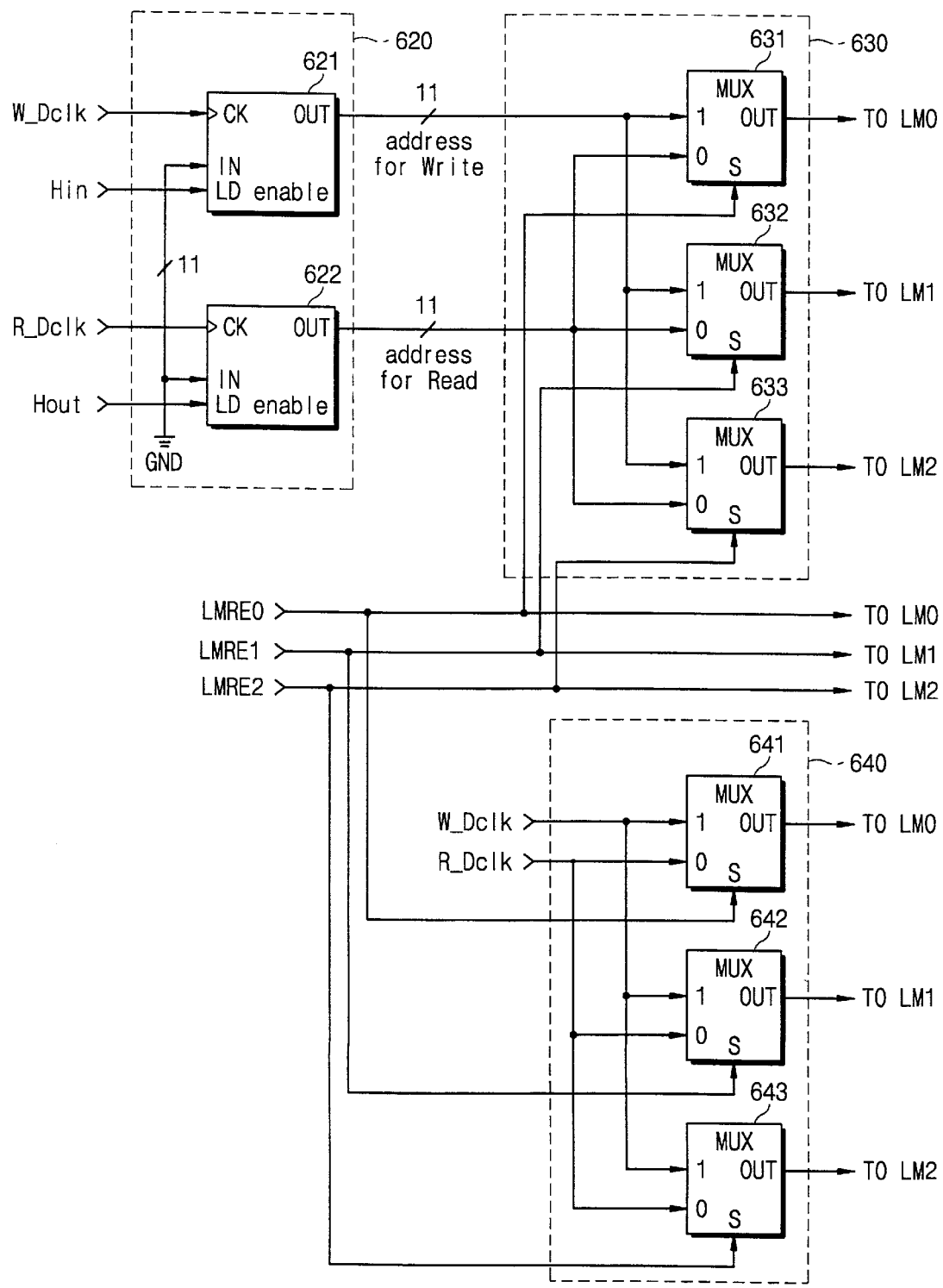
FIG. 16 is a circuit diagram of the address generator, the address selector and the clock selector which are associated with one another.

FIG. 16 shows the address generation circuit 620, address selection circuit 630 and the clock selection circuit 640 which are shown in FIG. 3, Referring to FIG. 16, the address generation circuit 620 has a write address generator 621 and a read address generator 622, each of which comprises an up-counter, The write address generator 621 is reset by the horizontal synchronism signal Hin and generates write address W_add for a write operation in synchronization with the write pixel clock W_Dclk. The read address generator 622 is reset by the horizontal output signal Hout and generates read address R_add for a read operation in synchronism with the read pixel clock R_Dclk.

The address selection circuit 630 includes three 2×1 multiplexers 631, 632 and 633. Two input terminals of each multiplexer are supplied with the write and read addresses W_Add and R_Add, respectively. The outputs of the multiplexers 631, 632 and 633 are respectively provided to the line memories LM0, LM1 and LM2. The read enable signals LMRE0, LMRE1 and LMRE2 are respectively supplied to the selection control terminals of the multiplexers 631, 632 and 633. The address selection circuit 630 selectively supplies the write and read addresses W_Add and R_Add to the line memories LM0, LM1 and LM2 in each memory block.

The clock selection circuit 640, like the address selection circuit 630, comprises three 2×1 multiplexers 641, 642 and 643. Two input terminals of each multiplexer are provided with the write and read pixel clock signals W_Dclk and R_Dclk, respectively. The outputs of the multiplexers 641, 642 and 643 are respectively supplied to the line memories LM0, LM1 and LM2 in each memory block. The read enable signals LMRE0 LMRE1 and LMRE2 are respectively supplied to the selection control terminals of the multiplexers 641, 642 and 643. The clock selection circuit 640 selectively supplies the write and read pixel clock signals W_Dclk and R-Dclk to the line memories LM0, LM1 and LM2 in each memory block.

As described above, even though a high-resolution supporting display device having a video signal converting apparatus according to the present invention receives a low-resolution video signal from a host, an image corresponding to the video signal can be displayed on the entire screen of the display device by means of the video signal converting apparatus and also it is possible to easily adjust a conversion rate of display mode.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A liquid crystal display (LCD) device for receiving horizontal and vertical synchronization signals and at least one analog video signal synchronized with said horizontal video signal from a host and displaying an image on a screen thereof, said LCD device comprising:

a display mode discriminating means for discriminating a display mode supported by said host in response to said horizontal and vertical synchronization signals to generate first and second mode signals and first, second, third, fourth and fifth data signals related to said discriminated display mode;

a clock generator for generating first and second pixel clock signals in synchronization with said horizontal synchronization signal, said first and second pixel clock signals respectively having frequencies corresponding to said first and second data signals, a number of pulses of said first pixel clock signal corresponding to one horizontal line being equal to a value of said first data signal, and a number of pulses of said second pixel clock signal corresponding to one horizontal line being equal to a value of said second data signal;

an analog-to-digital converter (ADC) for converting said at least one analog video signal into a digital video signal in synchronism with said first pixel clock signal;

a memory for storing said digital video signal;

a horizontal output generator for receiving said third and fourth data signals in response to said vertical synchronization signal and generating a horizontal output signal, said digital video signal being read from said memory in synchronism with said horizontal output signal, a number of pixels per cycle of said horizontal output signal being equal to a value of said third data signal, and a number of pixels per pulse width of said horizontal output signal being equal to a value of said fourth data signal; and a memory controller for controlling reading and storing operations of said memory in accordance with said horizontal synchronization signal, said horizontal output signal, said third and fifth data signals, and said first and second pixel clock signals, said reading operation being delayed from a rising edge of said horizontal synchronization signal to a period corresponding to a value of said fifth data signal and then activated, whereby said reading and storing operations are not simultaneously activated.

2. The LCD device of claim 1, said clock generator comprising two PLL (phase locked loop) circuits which are respectively initialized in accordance with said first and second data signals.

3. The LCD device of claim 1, said memory comprising:

at least three line memories for storing said digital video signal from the ADC and corresponding to one horizontal line, and a means for selectively outputting data from said line memories in response to a data selection signal from said memory controller.

4. The LCD device of claim 1, said ADC converting analog R (red), G (green) and B (blue) signals into digital R, G and B signals, respectively, and said memory comprising three memory blocks corresponding to said digital R, G and B signal and three multiplexers;

each of said three memory blocks having at least three line memories, each of which stores said digital video signal from said ADC and corresponding to one horizontal line, and each of said three multiplexers selectively outputting data from said line memories in response to a data selection signal from said memory controller.

5. The LCD device of claim 4, said memory controller comprising: a memory operation control circuit for receiving said third and fifth data signals and said first and second pixel clock signals, and for providing a first enable signal for said reading operation to one of said line memories and a second enable signal for said storing operation to another of said line memories; an address generator for generating read and write address signals in response to said first and second pixel clock signals, said horizontal synchronization signal and said horizontal output signal; an address selection circuit for selecting said read and write address signals by means of said memory operation control circuit to provide a selected address signal to each of said line memories; and a clock selection circuit for selecting said first and second pixel clock signals by means of said memory operation control circuit to provide said selected pixel clock signal to each of said line memories.

6. The LCD device of claim 5, said memory operation control circuit comprising: means for generating a write starting control signal in response to said third and fifth data signals, said write starting control signals being indicative of the write operation; a means for generating write enable signals corresponding to said line memories and first and second memory index signals in response to said first pixel clock signal and said write starting control signal, said first and second index signals being indicative of enabled states of said line memories; and a means for generating read enable signals corresponding to said line memories in response to said second pixel clock signal and said first and second memory index signals.

7. The LCD device of claim 1, said horizontal output generator comprising: a counter for loading a value of said third data signal in response to said vertical synchronization signal and down-counting said value every rising edge of said second pixel clock signal; a first comparator for comparing said third data signal with an output signal of said counter to generate a first comparison signal; a second comparator for comparing a value of least significant n-bits of said second data signal with said fourth data signal to generate a second comparison signal, n being a positive integer; and a JK-flip-flop for receiving said first and second comparison signals through J and K input terminals thereof.

8. The LCD device of claim 1, said memory, said horizontal output generator and said memory controller together comprising a single chip.

9. An apparatus for converting analog video signals of a first display into digital video signals of a second display, comprising:

a memory for storing said digital video signals, a horizontal output generator for receiving first and second data signals and a horizontal synchronization signal and for generating a horizontal output signal for enabling said digital video signals corresponding to each horizontal line of said second display to be stored or read from said memory, a number of pixels per cycle of said horizontal output signal being equal to a value of said first data signal, and a number of pixelse per pulse width of said horizontal output signal being equal to a value of said second data signal; and a memory controller for controlling reading and storing operations of said memory in accordance with said horizontal synchronization signal and a vertical synchronization signal, said horizontal output signal, said first data signal, a third data signal determined according to frequencies of said horizontal and vertical synchronization signals, a first pixel clock signal for a write operation of said memory and a second pixel clock signal for a read operation of said memory.

10. The apparatus of claim 9, said video signal converting apparatus comprising a single chip.

* * * * *